United States Patent [19]
Larson

[11] 4,159,142
[45] Jun. 26, 1979

[54] FOLDABLE EXTERIOR FEEDING AND WATERING FACILITIES FOR ANIMAL CARRYING VEHICLES

[76] Inventor: Wallace M. Larson 612 Shasta La., Costa Mesa, Calif. 92626

[21] Appl. No.: 804,865

[22] Filed: Jun. 9, 1977

[51] Int. Cl.² ............................................. A01K 1/02
[52] U.S. Cl. ..................................... 296/24 C; 119/20
[58] Field of Search ................. 296/24 C; 119/20, 61, 119/68, 69

[56] References Cited
U.S. PATENT DOCUMENTS

| D. 149,786 | 6/1948 | Arisman | 296/24 C |
| 591,792 | 10/1897 | Stitzer | 296/24 C |
| 3,726,256 | 4/1973 | Bernhardt | 296/24 C |

FOREIGN PATENT DOCUMENTS 23086 of 1913 United Kingdom .................. 296/24 C Primary Examiner—Philip Goodman
Attorney, Agent, or Firm—Clarence M. Crews

[57] ABSTRACT

It is common practice to transport horses and other animals from race track to race track, or rodeo to rodeo, and in general from place to place, in motor driven vehicles such as trailers or closed trucks which afford shelter, but as a rule there are not suitable individualized feeding and watering facilities for the vehicle-carried animals along the roadway. That deficiency is supplied by the present invention.

11 Claims, 13 Drawing Figures

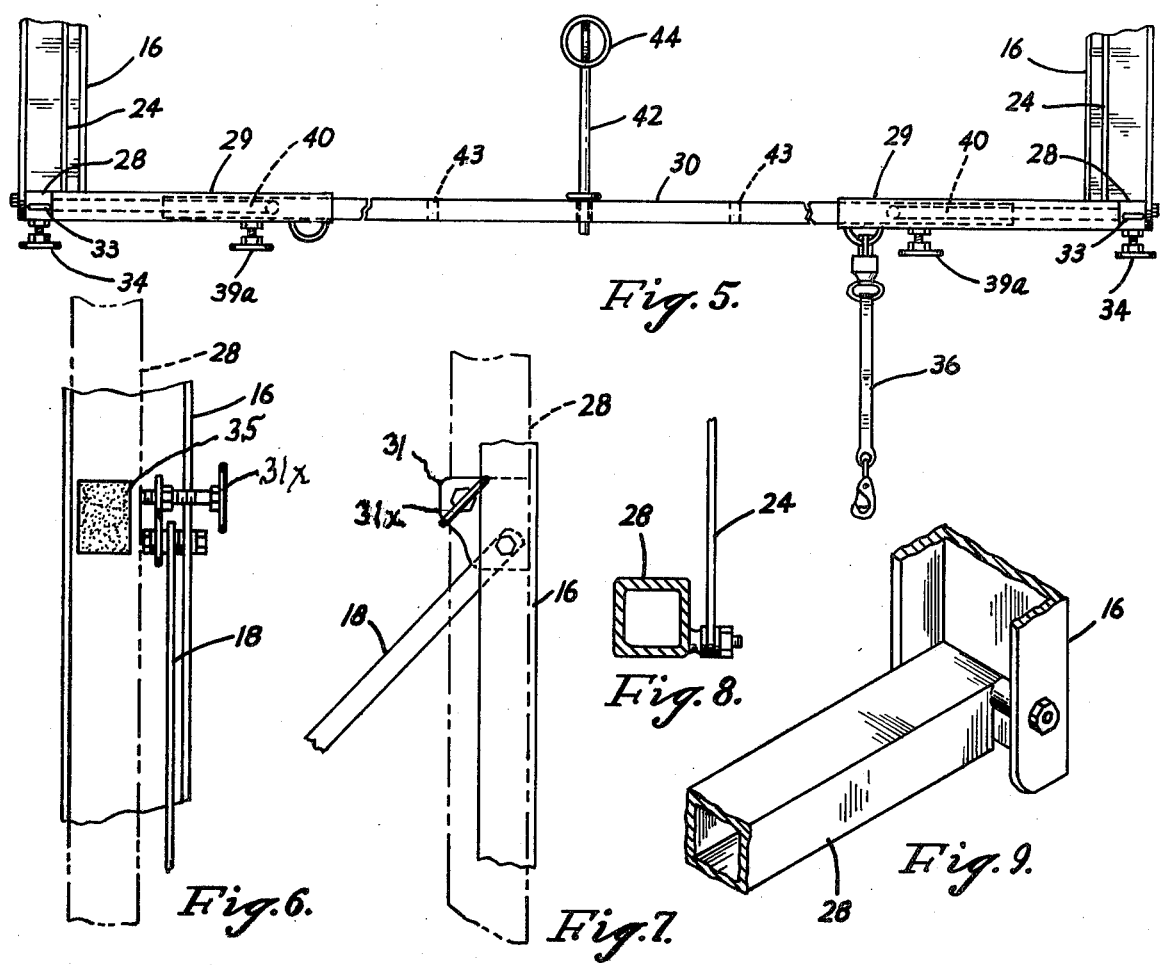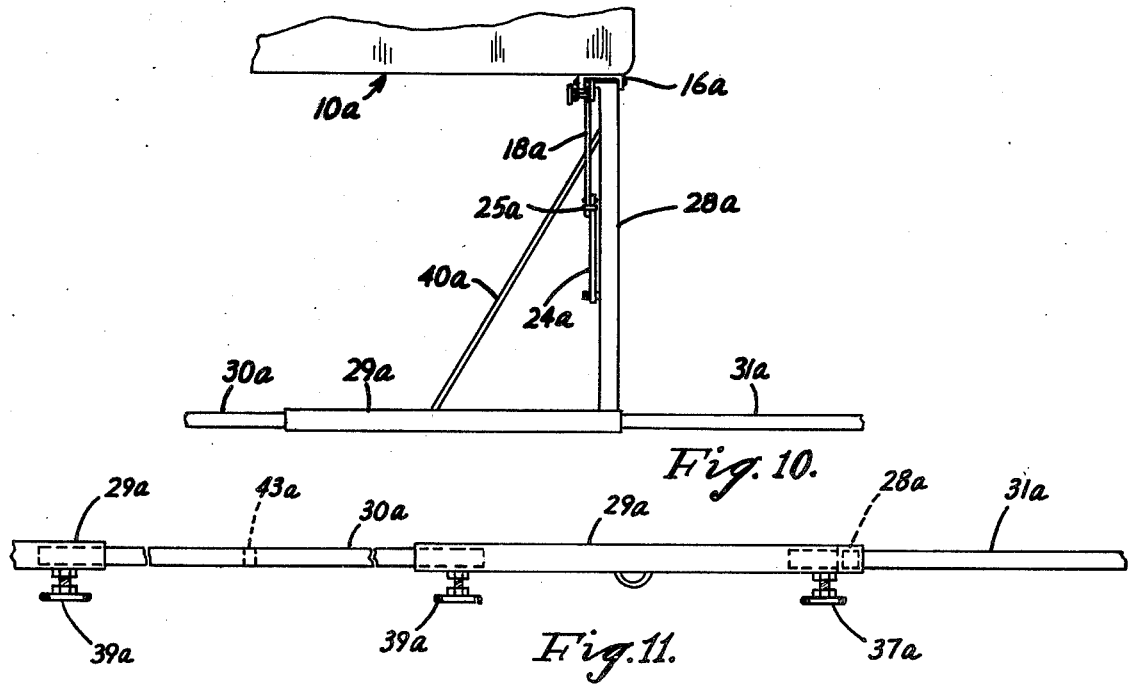

FOLDABLE EXTERIOR FEEDING AND WATERING FACILITIES FOR ANIMAL CARRYING VEHICLES

When horses are transported by means of a trailer or truck from one place to another it is desirable to interrupt the journey from time to time in order individually to feed and water them, and to give them an opportunity to recover their land legs. While the animals involved are not necessarily horses, horses are the animals most frequently involved, and the invention will be described in the main as if horses only are involved.

As a general rule, there are not feeding and watering facilities for horses along the roads, corresponding to the cafes and restaurants available to people. It is a simple matter to carry hay and, if desired, even water, for horses, but it is not feasible to feed and water horses within the trailer or other transporting vehicle. Among other objections, this would be inconvenient, and it would also involve the provision of fixed protruding instrumentalities within the vehicle which could be dangerous to the animals whenever the vehicle is in motion.

In accordance with the present invention, the provision of external, retractible stall defining, and individualized feeding and watering means on the vehicle, itself, is contemplated.

It is utterly out of the question, of course, to provide fixed laterally extending, stall defining or feeding facilities on a vehicle side, but in accordance with the present invention retractible exterior individualized feeding and watering means, optionally in combination with stall dividers, are supported on one or both sides of the vehicle. These dividers are foldable upward and normally hug the vehicle wall closely, but they can be let down when the trailer is parked in a suitable location, to define one or more stall spaces alongside the trailer, together with suitable water and feed dispensing facilities.

Other objects and advantages will hereinafter appear.

In the drawing forming part of this specification,

FIG. 1. is a fragmentary, perspective view showing a short horse trailer having a single stall defining means in letdown condition, the stall defining means being desirably suitable for accommodating two horses side by side;

FIG. 5 is a fragmentary view in elevation showing details of a two-horse stall;

FIG. 6 is a fragmentary detail view looking into a channel bar which is affixed to a vehicle side and showing how the stall forming means is fixed in retracted, inactive position;

FIG. 7 is a fragmentary view in side elevation showing the structure of FIG. 6;

FIG. 8 is a fragmentary sectional view showing the connection of a toggle with one of the stall limiting members;

FIG. 9 is a fragmentary perspective view showing the hinged connection of a stall limiting member to the supporting channel member thereof;

FIG. 10 is a fragmentary plan view of a modified hay and water carrier in which the stall dividers are omitted but the hay and water supporting bars are extended lengthwise of the vehicle to restrict the horses' movements and to provide a hanger means for wearing apparel, harness, etc.;

FIG. 11 is a plan view of a portion of the structure shown in FIG. 10;

In actual practice a horse transporting vehicle may accommodate as many as eight horses and have provision for four two-horse external stalls on one side of the vehicle. In point of fact, stall forming and horse feeding facilities suitable for simultaneously serving eight horses at each side of a vehicle may be provided for eight horses carried in that vehicle and eight horses carried in one or more associated or accompanying vehicles not equipped with external stall defining, and individualized feeding and watering facilities.

Virtually every significant detail of the invention, however, can be adequately shown and described by disclosing a relatively short vehicle equipped with a single, two-horse stall defining, feeding and watering means. It is to be understood, however, that when plural stall defining means are involved all the stall defining means located at one side of the vehicle would be put up and let down together as a single unit.

Figure 1:
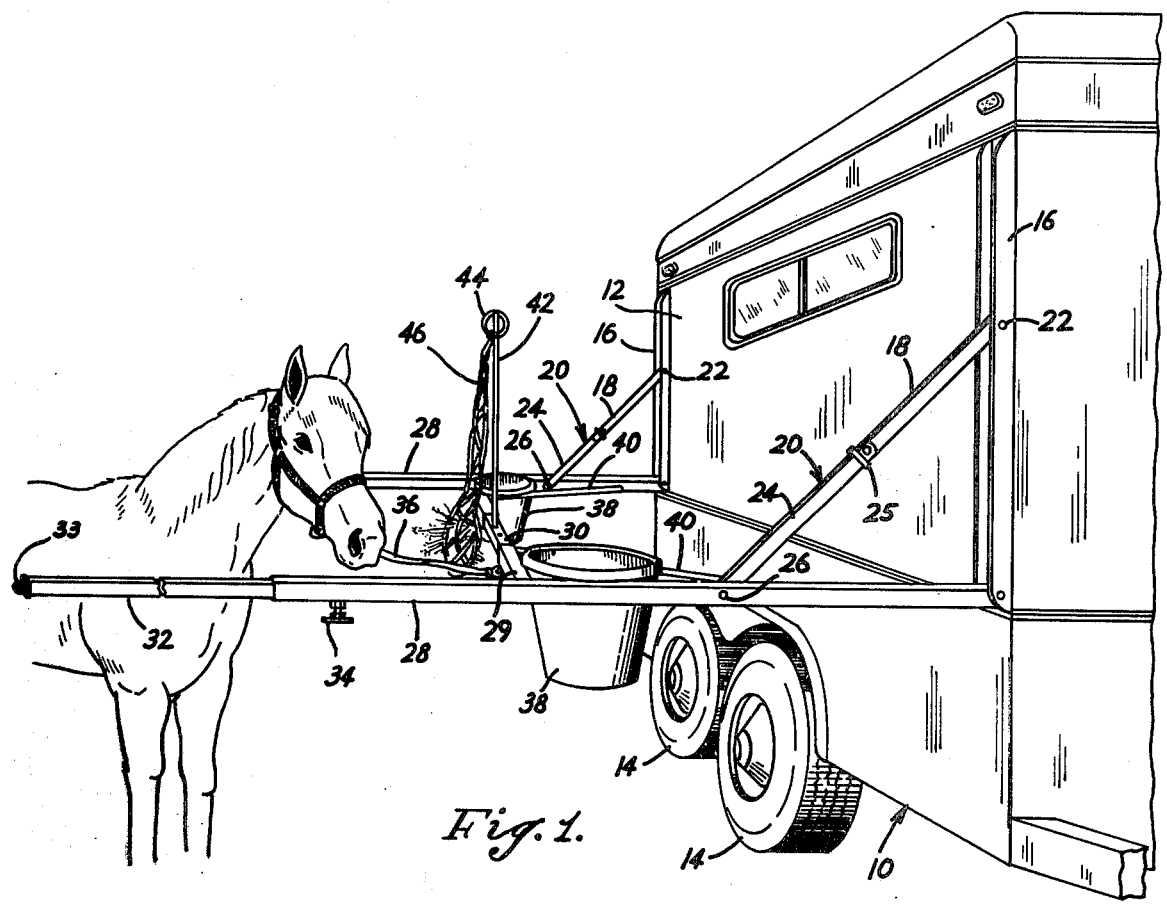
Figure 2:
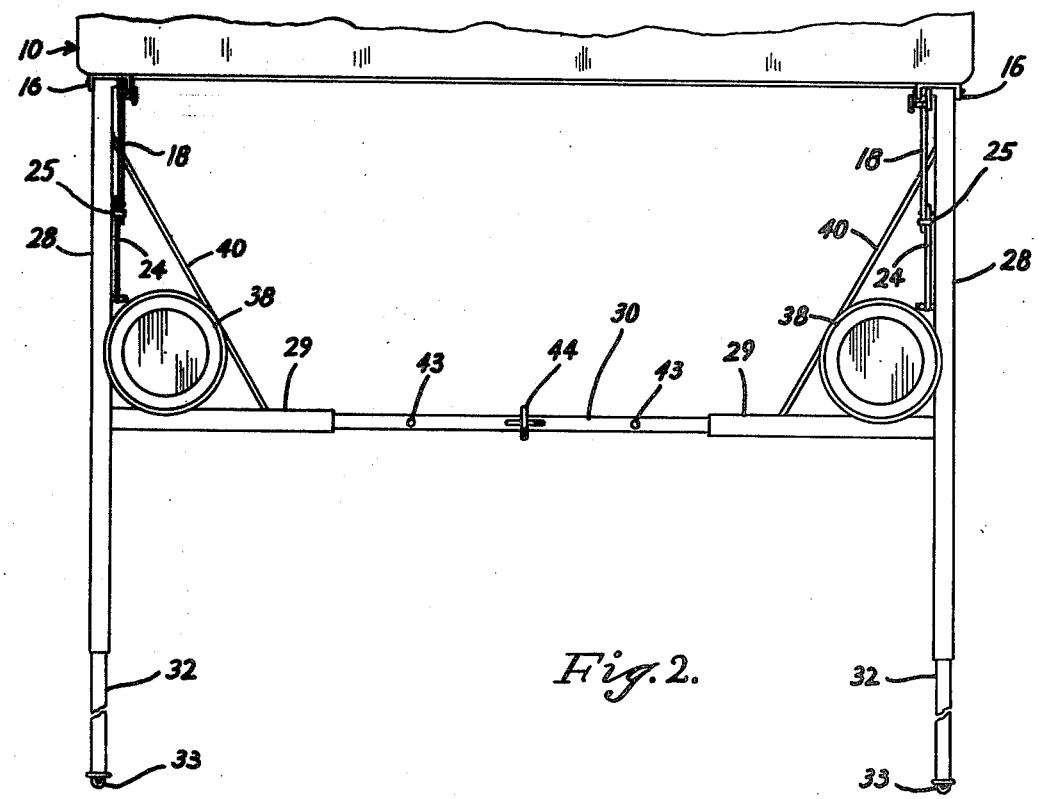
FIG. 2 is a fragmentary, plan view of the structure illustrated in FIG. 1.
Figure 3:
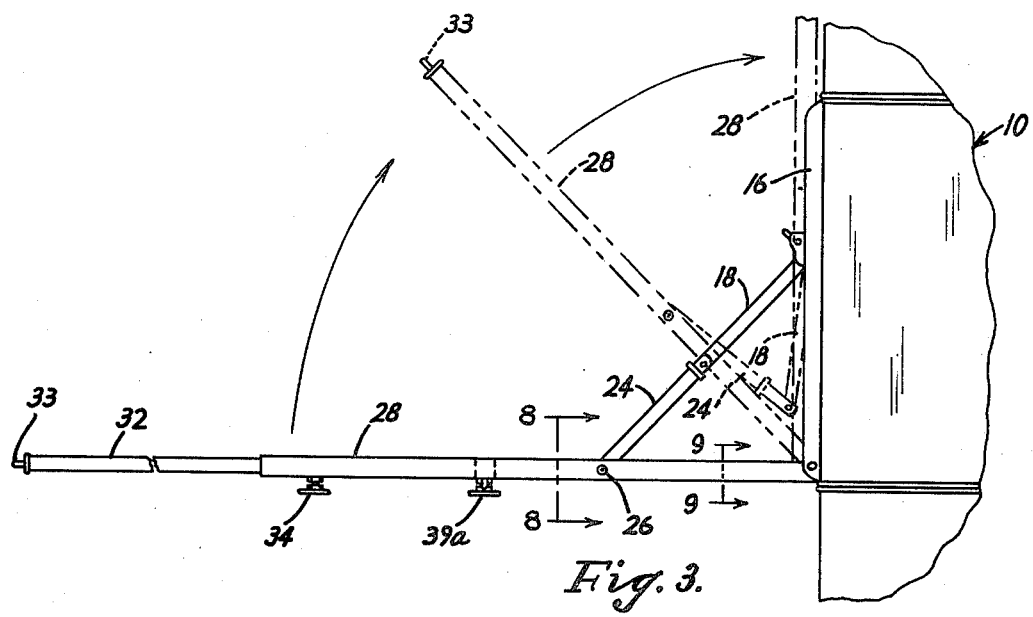
FIG. 3 is a fragmentary diagrammatic view in front elevation showing how the stall definers and appurtenant mechanisms are mounted and may be operated between active and inactive positions.
Figure 4:
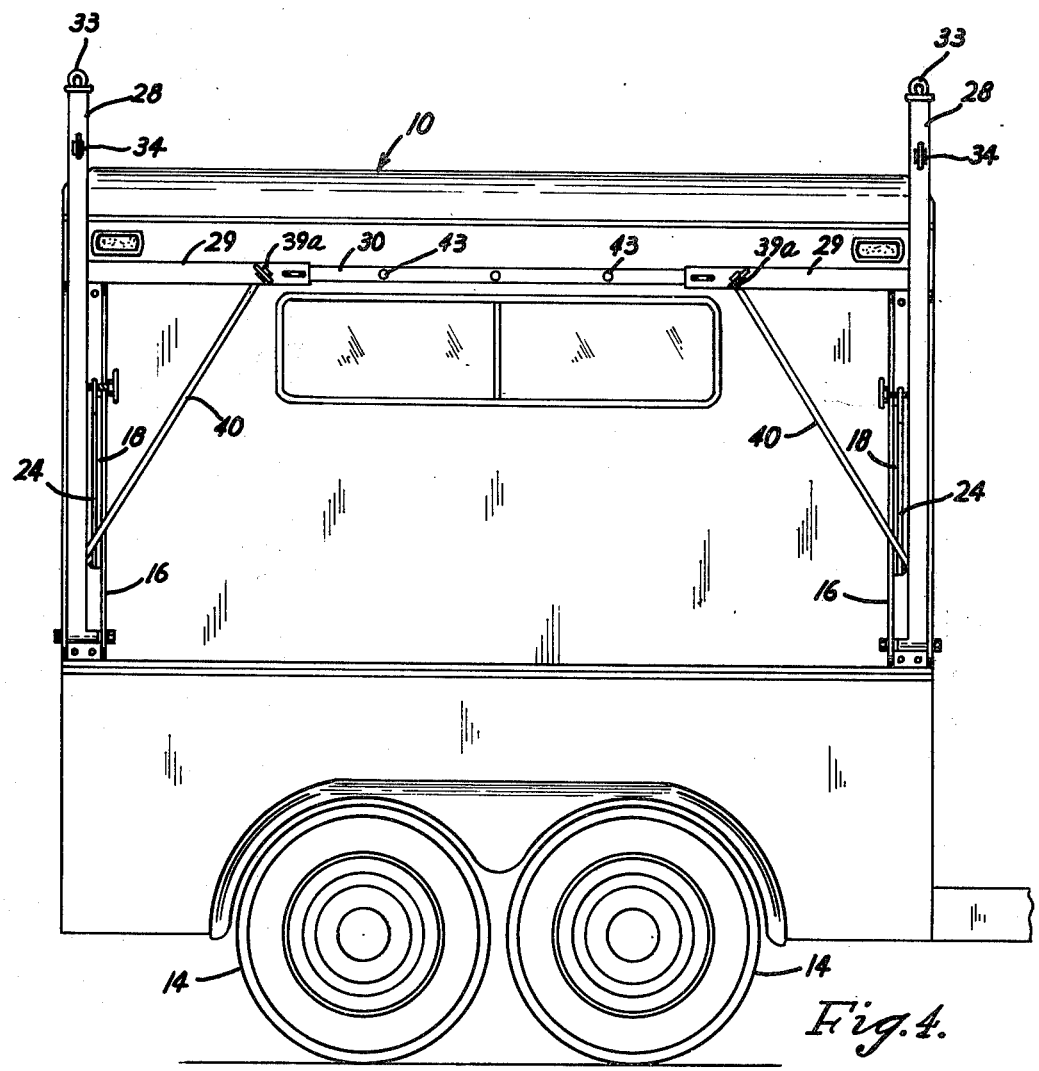
FIG. 4 is a fragmentary view in side elevation showing the stall defining, feeding and watering instrumentalities in ineffective, out of the way, running position.

In FIG. 1 a relatively short vehicle is fragmentarily shown in perspective. The illustrated vehicle is in every respect conventional, apart from the novel stall defining, watering and feeding means affixed to one of its sides.

When in running position the stall defining means should dependably hug the vehicle closely and should not extend substantially above the roof of the vehicle.

The vehicle 10, itself, is generally of conventional construction, being equipped with a closed body 12, wheels 14, a spring system (not shown), and either with driving and control means (not shown) or means for connecting it in a conventional manner to a conventional towing motor vehicle. The disclosed vehicle is also desirably provided at its rear end with rear doors and a retractible ramp (not shown).

In accordance with the invention as disclosed in FIGS. 1 to 9, upright parallel channel bars 16 are affixed to one side of the vehicle. Inner links 18 of toggles 20 are pivotally connected at their inner ends to the respective front and rear channel bars 16 by pivot pins 22. Associated links 18 and 24 overlap one another and may be maintained in alignment when let down by a rectangular retaining ring 25. The lower links 24 of toggles 20 are pivotally connected at their lower ends through pivot pins 26 to hollow bars 28, the bars 28 being desirably square in cross-section.

As seen in FIG. 1 the toggles 20 have been let down to straight conditions where they support the bars 28 in horizontal positions. The bars 28 have hollow side branches 29 which are rigidly connected to one another by a crossbar 30 so that the bars 28 necessarily swing up and down in unison. Set screws 39a fix the relationship of the bar 30 to the bars 29. The crossbar 30 is adapted to be fitted into the branches 29 to variable chosen depths according to the selected width of the stall space. The bars 28 are spaced from one another so that, when let down, they provide a stall space between them suitable for two horses.

The bars 28 are restricted in length so that, when upright, they do not extend an objectionable distance above the top of the vehicle body. These bars 28 are necessarily too restricted in length to provide adequate stall dividers when let down. Telescoping extension bars 32 are accordingly provided. Each extension bar 32 is provided at its outer end with a draw ring 33 and each is retained in adjusted, stall limiting position by a set screw 34.

Each channel bar 16 has affixed to it a plate 31 through which a screw 31x is threaded. When the vehicle is to go into motion the screw 31x can be adjusted to hold the associated member 28 firmly and fixedly in upright position.

Each channel bar 16 has adhesively affixed to it a sponge rubber pad 35 engageable with the associated bar 28a for cushioning the parts and preventing rattles when the stall forming mechanism is in raised position.

The horse stall is bounded at its inner extremity by the bars 29 and 30, but is open at its outer side, each horse being confined in his movements by a short halter strap 36 which is releasably latched to the bar 29.

Each stall is desirably of a width to accommodate two horses. Provision is made of two water buckets 38,38, one for each horse, each bucket being adapted to be supported by its rim in a triangle formed by the bar 29, one of the bars 28, and a diagonal bar 40.

At the center of the bar 30 a pole 42 is removably held in upright position, the pole having at its upper end a ring 44 from which hay supporting means 46 may be removably suspended. A single pole 42 is shown in the drawing but, as seen in FIG. 5, additional holes 43 are provided in the bar 30 so that two hay net holding poles 42 can be provided, one for each horse, the lead strap 36 of each horse being too short to permit him to reach the other horse's hay.

while the structure of FIGS. 1 to 9, inclusive, include stall dividing members that extend well out from the vehicle when let down, these members are not necessary for other animals and are not absolutely essential for horses.

Figure 12:
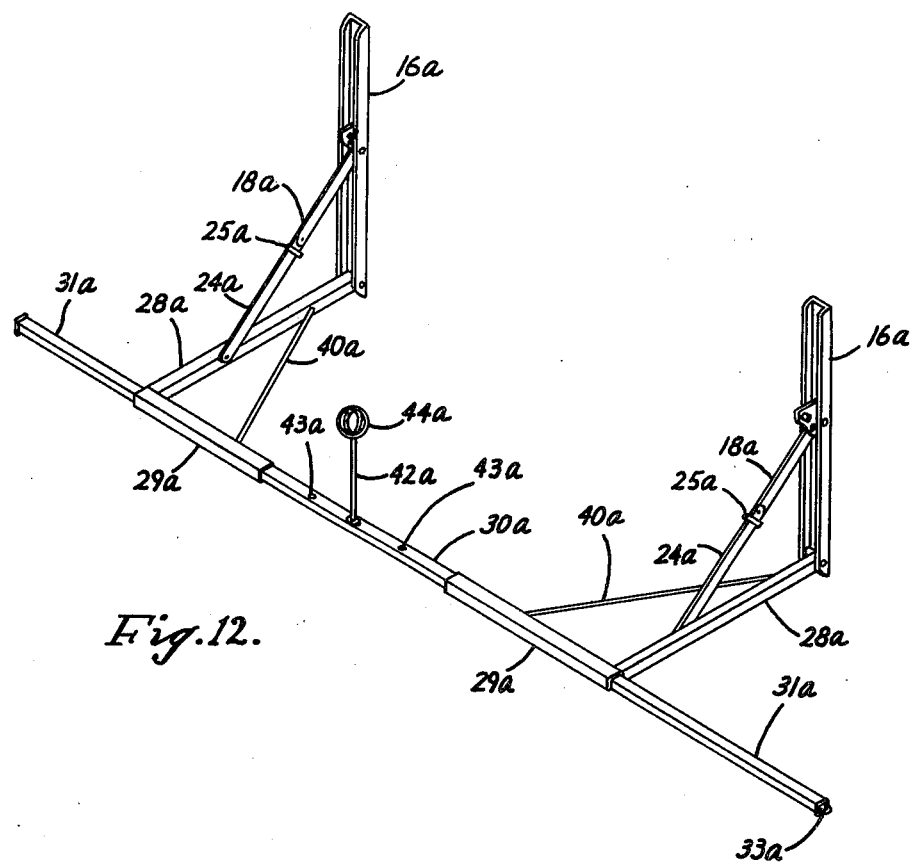
FIG. 12 is a perspective view of the modified structure in which the stall dividers are omitted.

In FIGS. 10 to 12, inclusive, a modified structure is illustrated generally similar to that of FIGS. 1 to 9, in which corresponding reference characters are applied to corresponding parts with the subscript "a" added in each instance and the foregoing description will not be repeated.

In this instance, however, the members 28a do not extend outward beyond the members 29a and the hollow members 29a receive extension members 31a which horses on a short tether cannot go around. A set screw 37a fixes the position of 31a relative to 29a.

The extension members 31a not only restrict movements of the tethered animals but they constitute convenient temporary hangers for harness, blankets, sweaters and the like.

Figure 13:
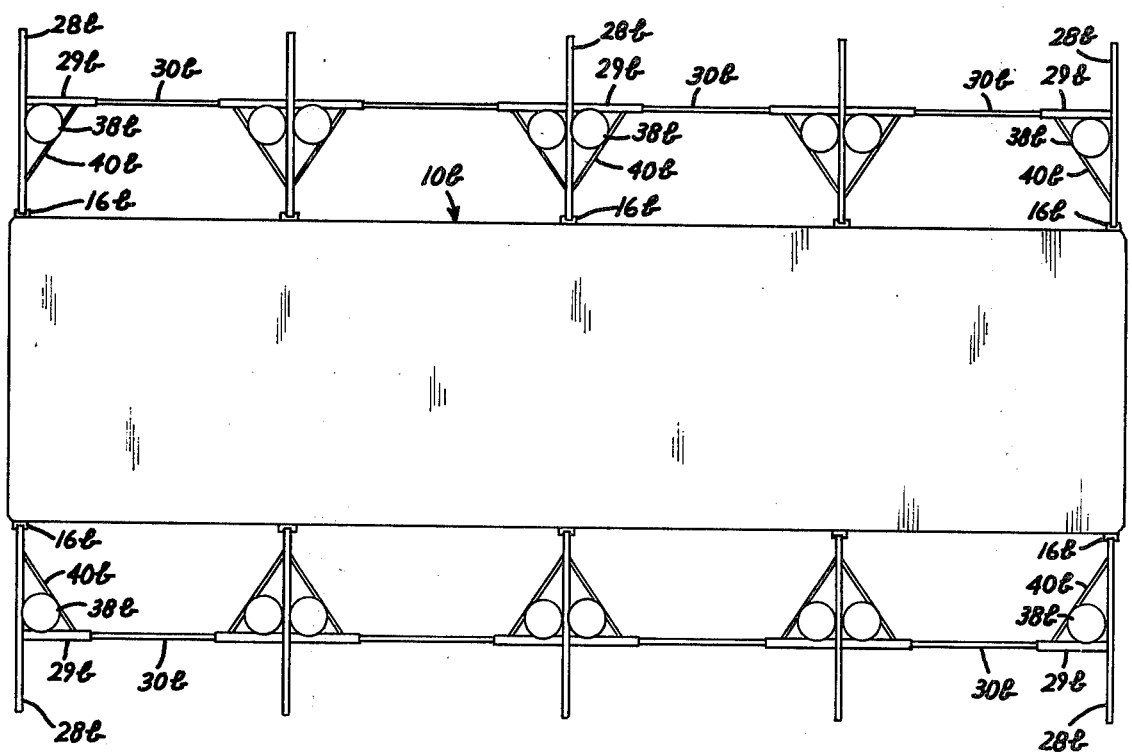
FIG. 13 is a diagrammatic plan view of a long animal carrying vehicle with four two-horse stalls on each side in active positions.

FIG. 13 is a somewhat diagrammatic plan view of a truck or trailer generally similar in detail to the structure of FIGS. 1 to 9, and while the figure does not show all the details of FIGS. 1 to 9, those details may be assumed to be present throughout, and corresponding reference characters with the subscript "b" added have been applied in a number of instances to corresponding parts. The reference characters have been omitted in some instances, not because the structural details vary, but because the present showing is clear and adequate.

What is shown in FIG. 13 is a vehicle of adequate length to carry at least eight animals, with four two-horse stalls on each side of the vehicle in lowered condition. The stalls are shown in let-down, feeding, watering and stall limiting condition, but they can, of course, be swung up and secured against opposite sides of the vehicle with full advantage taken of all the details set forth in connection with FIGS. 1 to 9 or 10 to 12.

I have described what I believe to be the best embodiment of my invention. What I desire to cover by letters patent, however, is set forth in the appended claims.

I claim:

1. A wheeled vehicle for the enclosed transporting and the individualized feeding and watering of animals, including horses, having fixed side wall structures that extend substantially the full length of an animal carrying enclosure, and at at least one of its outer sides animal restricting, stall-defining means constructed and arranged to be carried in an upright inactive attitude snugly against the outer face of said fixed vehicle side when the vehicle is in motion but to be swung down about a horizontal fore-and-aft extending axis to a position to feed, water and restrict the animals individually when the vehicle is at rest.

2. A wheeled vehicle for the transportation of animals, as set forth in claim 1, in which the animal restricting means include first pivotally mounted members which, in upright vehicle running position, hug an adjacent side of the vehicle and do not extend more than a short distance above it, and extension members carried by the first members which in running position may be made substantially co-terminous with the upper ends of the first members, but in let-down positions may be readjusted to, and fixed in, substantially extended stall defining positions.

3. A wheeled vehicle for the transportation of animals as set forth in claim 2 in which the pivotally mounted members are hollow, the extension members are telescopically received therein, and the pivotally mounted members carry set screws whereby the extension members may be fixed in selected adjusted positions.

4. A wheeled vehicle as set forth in claim 1 in which the animal restricting means at a vehicle side is constructed and arranged as an operating unit to provide a plurality of simultaneously retractible adjacent stalls at at least one side of the vehicle.

5. A wheeled vehicle as set forth in claim 4 in which like stall defining means are provided at opposite sides of the vehicle.

6. A wheeled vehicle as set forth in claim 4 in which provision is made between the stall defining means of each adjacent pair, of rigid connecting and spacing means which requires the stall defining means to move up and down in unison.

7. A wheeled vehicle as set forth in claim 6 in which the rigid spacing means are adjustable in effective length.

8. A wheeled vehicle as set forth in claim 6 in which each stall is made wide enough for two horses, the rigid spacing means carry for the respective horses distinct hay carrying supports, and two short horse tethers, the relationship of the hay carriers and the short tethers being such that each horse can reach only the hay in a single carrier intended for him.

9. A wheeled vehicle as set forth in claim 8 in which each stall includes two individual water bucket supports, each within the reach of only one of the horses.

10. A wheeled vehicle as set forth in claim 1 in which four two-horse stalls are provided at a given side of the vehicle.

11. A wheeled vehicle as set forth in claim 1 in which a plurality of two-horse stalls are provided on each side of the vehicle.

* * * * *